Figure 1:
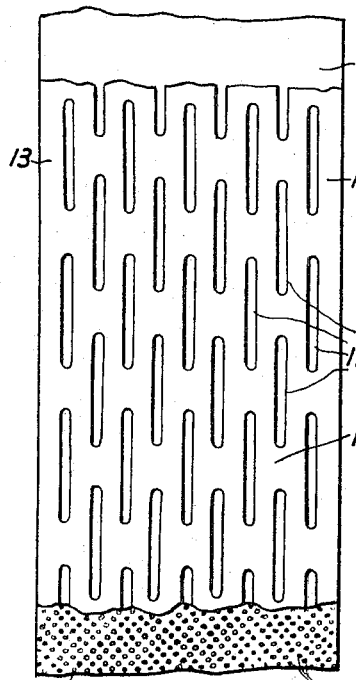

March 12, 1968     P. EISLER     3,372,487
METHOD OF DRYING BY ELECTRICAL MEANS

Filed July 10, 1963     2 Sheets-Sheet 1

Inventor
Paul Eisler

March 12, 1968  P. EISLER  3,372,487
METHOD OF DRYING BY ELECTRICAL MEANS

Filed July 10, 1963  2 Sheets-Sheet 2

Inventor
Paul Eisler

United States Patent Office 3,372,487
Patented Mar. 12, 1968

3,372,487
METHOD OF DRYING BY ELECTICAL MEANS
Paul Eisler, 57 Exeter Road, London NW. 2, England
Continuation-in-part of application Ser. No. 783,609,
Dec. 29, 1958. This application July 10, 1963, Ser.
No. 293,953
Claims priority, application Great Britain, Jan. 7, 1958,
582/58
1 Claim. (Cl. 34—1)

This is a continuation-in-part of my application Ser. No. 783,609 filed Dec. 29, 1958, now Patent No. 3,099,540.

The present invention relates to the acceleration by heat of physical or chemical processes which involve a change of state in regard to a thin layer of fluid carried by a durable structure at rest. The change may be a change of the liquid into a solid or into a vapour. It may be the acceleration of the curing of a thermosetting liquid of resin film into a solid plastic film or it may be a change of state from an absorbed or adsorbed substance into a free vapour such as the driving off in vapour form of a fluid absorbed in a thin layer of finely divided substance as occurs in certain types of refrigerating processes and apparatus. The invention is specially concerned with acceleration by heat of change in a layer of fluid in such cases as exhibit a sudden transition of the state of the fluid when the temperature reaches a particular value depending on the material and the ambient conditions.

An example is a paint in which there is usually both the driving off of a solvent and the setting or hardening by chemical reaction of the other materials of the paint. Such a chemical reaction will usually have a critical temperature at which it occurs so rapidly that it can properly be described as a sudden transition and this temperature may be above or below the boiling point of the solvent. If it is only slightly above and if the painted object is slowly heated up to the boiling point of the solvent bubbles of the solvent will be driven off through the layer of paint and if as will usually be the case the remainder of the paint is already setting or hardening, the bubbles in seeking to escape, tend to damage the quality and finish of the paint. If the sudden transition temperature of the chemical reaction is below the boiling point of the solvent, when it is reached setting or hardening will take place suddenly, trapping the solvent within the set or hardened layer and again producing a defective layer.

Similar conditions arise in the gelling, setting or hardening or sintering of so-called plastics e.g. synthetic resins, which may or may not incorporate a solvent suspending medium, or a blowing agent or in their hardening reaction produce a proportion of another substance such as water which similarly to a solvent has to be evaporated.

Sudden transition into the set or hardened state of paint and plastics may also cause other physical faults in the final product, for instance variation in colour or hardness.

That these changes in state in general can be speeded up by heat is well known and it is also known that the rate of change rises with temperature. The latter effect means that the time could be cut down more than proportionately the closer the temperature of sudden transition under the prevailing pressure and other physical conditions can be approached but equally makes the use of temperature approximating that of sudden transition hazardous because conventional methods of heating make it very difficult except at considerable elaboration and expense to avoid uneven heating with the risk of hot spots at which the point of sudden transition is reached locally; moreover the conventional methods and apparatus for ensuring even heating may not be compatible in many cases with the nature of the material or object to be heated.

Sudden transitions can also occur which are hazardous for other reasons. For instance the temperature of sudden transition may be very close to the temperature at which decomposition or other deterioration takes place or again before bubbles of a blowing agent can properly be dispersed into a substance which is being simultaneously set and converted into a spongy or similar material. Here again heat may be desirable for speeding up operations or even for causing the necessary actions to take place but the heating must be carefully controlled to avoid local over-heating or generally heating above a quite narrow temperature range so that the term "sudden transition" still applies.

The present invention deals with the problems of application of heat substantially accelerating the solidification of a porous material produced by chemical reaction in a layer of liquid without the risk of reaching the temperature of sudden transition at any point by bringing into good heat conductive contact with the layer substantially the whole area of a heating film the major part of the area of which is occupied by an electrically conductive surface pattern uniformly distributed, and passing an electric current through the surface pattern of sufficient intensity to raise its temperature without the maximum at any point reaching the temperature of sudden transition under the ambient conditions of the layer. Due to the good heat conductive connection heat can be transmitted to the layers by this method at a rate high enough to accelerate the reaction to a very substantial extent without necessitating a large temperature difference between the heating film and the fluid cover, thus avoiding the risks involved in other known methods of drying by heat.

It will be understood that the heating film is only connected to the supply temporarily, that is to say, when the actual heating is performed. Purely resistive heating by connecting the pattern directly to the supply is envisaged. The invention is not concerned with methods or apparatus in which the energy is transferred to the pattern inductively or capacitively.

It will be clear that the heating film used in the method of the invention being a very thin material, is of small mass and therefore of very low heat inertia. It will also be clear that such a thin material is very flexible.

The current used will generally be in the range of amperes while the resistance of the pattern will be in the range of ohms as distinct from milli-ohms or kilo-ohms. Desirably conditions are chosen so that the voltage drop across the pattern is of such a low value that it is not dangerous to human contact, that is usually below 50 volts.

The following examples of application of the invention with various substances will serve to give a more detailed illustration of specific physical and chemical reactions in layers of fluid which can be accelerated safely by homogeneous full surface heating by contact with a heating film of negligible thermal inertia.

(a) *Gelation of P.V.C. paste*

The paste consists of a paste polymer (such as GEON 121 supplied by British Geon Ltd.) which is a powder with particles of 1 to 2 micron size, ester plasticiser (such as dioctyl phthalate or trichresylphosphate) and a stabliser (such as dibasic lead sulphate). It has a fusing temperature of 170° C. which is also the limit or near the limit of the temperature endurance of the gelled film. The heating film operated to attain 150° C. gells the paste within a few seconds in safety.

(b) *Sintering of Teflon emulsion*

This emulsion of polytetrafluorethylene contains discrete fine particles which must be heated for a very short time only to 450° C. to sinter together. Local overheating causes breakdown of material while a temperature substantially lower fails to cause sintering.

(c) *Chemical blowing agents*

Such as Genitron A.C. an ozodicarbonamide (supplied by Whiffen & Sons, Ltd., North West House, Marylebone Road, London, N.W. 1) are often incorporated in pastes or rubber mixtures. They decompose at a certain temperature and expand due to liberation of nitrogen. When, as it is usually the case, this blowing action is to be utilised to produce pores in the substance the time-temperature conditions of the cure have to be so related to the blowing temperature that the nitrogen does not simply escape because the substance is still too liquid when the blowing agent decomposes. Nor must the substance already be set and hardened and not permit the pores to form.

The blending of the various ingredients to match desired hardening and decomposition times and temperatures is particularly difficult for thin layers and in these cases the method of the invention is of great help. The very low thermal inertia of the heating film and its homogeneity and thinness often permit stepped heating and stepped cure. It is, for instance, possible to first heat the paste film to a viscous consistency which will still permit pore formation without danger of gas escape and then quickly raise the temperature to that of decomposition of the blowing agent and subsequently continuing the full cure at the same or at a lower temperature, if necessary.

Further examples comprise substances coming between the two previous groups. They are, for instance, solentless films of resins and hardeners or elastomeric compounds in which the method of the invention does not so much bring a marked improvement in the control of the physical and chemical reactions apart from their acceleration but does afford other savings and advantages.

The case of resin impregnated glass fibre mouldings is described in this specification at a later stage and the examples given are only typical. Usually the impregnant is a solventless polyester, epoxy, silicone resin or another compound the cure of which can be accelerated by heat below the rate at which the setting and hardening is a matter of seconds for a thin film.

As a final example the vulcanisation of elastomeric layers such as rubber sheeting directly on a heating film having a cotton fabric base can be mentioned. The compound can be formulated so that it can be thoroughly mixed in the mill without danger of the heat developed in this mixing causing the accelerator to cure the compound in the mill. The coating of the fabric can proceed conveniently without special drying or vulcanising plant. Vulcanising is then effected by raising the heating film to the lowest temperature in the range between say 90° and 130° C. which the speed of production permits. The product can be used as a rubber floor covering material incorporating a heating film which can be used permanently for floor heating purposes at a low loading (approx. 15 watts sq. ft.).

A typical vulcanisable rubber sheating compound which can be used in this way consists of the following:

| | Parts by weight |
|---|---|
| Natural rubber (smoked sheet) | 100 |
| Carbon black | 50 |
| Sulphur | 2 |
| Zinc oxide (ZnO) | 5 |
| Stearic acid | 1 |
| Pine tar | 5 |
| Accelerator MBT (mercaptobenzthiazole) | 1½ |
| Accelerator TMT (tetramethylthiuram tetra-sulphide) | ½ |

Figure 2:
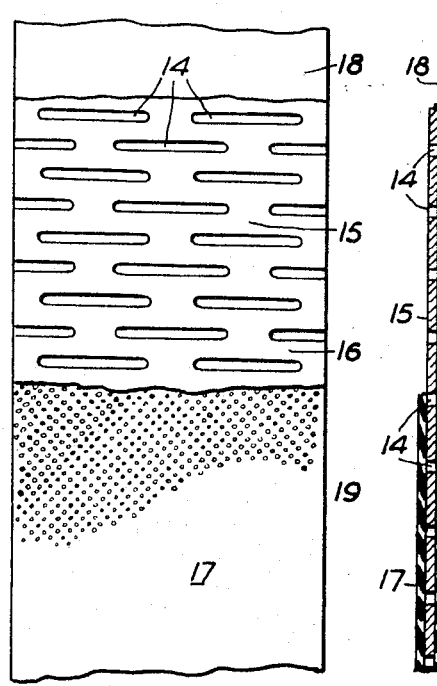
Figure 3:
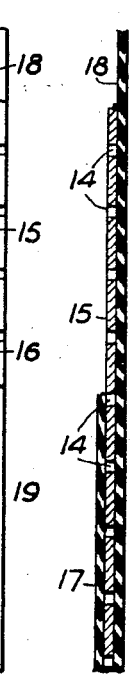
Figure 4:
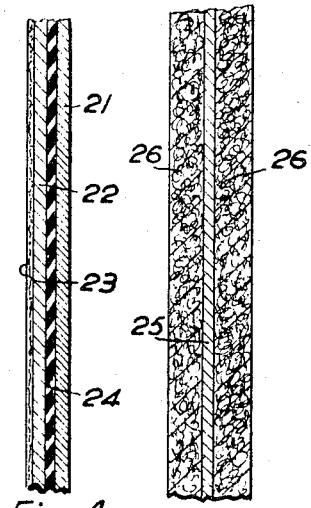
Figure 5:
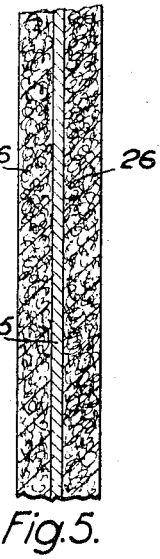
Figure 6:
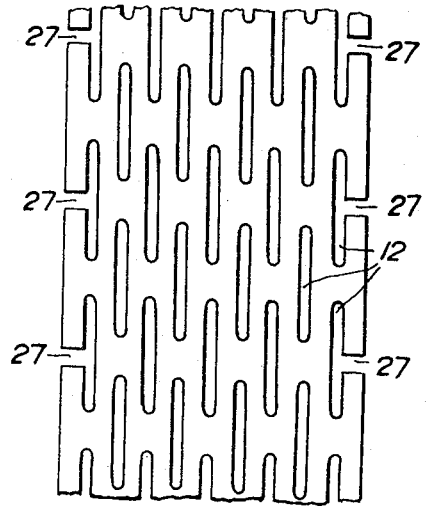
Figure 7:
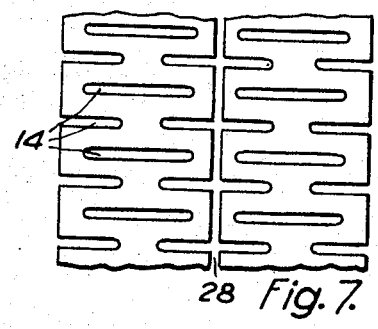
Figure 8:
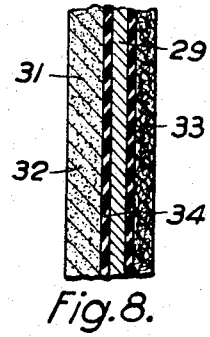

The invention will be further described with reference to the accompanying diagrammatic drawings in which FIGURE 1 is a plan view of one form of heating film used in the invention with some parts broken away, FIGURE 2 is a plan view of an alternative form, FIGURE 3 is a section which applies equally to FIGURE 1 or 2, FIGURE 4 illustrates the application of the invention to the drying of paint, FIGURE 5 illustrates the application of the invention to the curing of plastics, FIGURES 6 and 7 illustrate developments of the conductive pattern of the films of FIGURES 1 and 2 respectively, FIGURE 8 is a detail section illustrating a further development.

In the form shown in FIGURE 1 the conductive pattern is a thin flexible metalic foil 11 having a series of slots 12 which leave a plurality of parallel meandering paths extending from terminals 13 constituted by the areas along the sides of the pattern. If the width of the arms of the pattern is kept constant each meandering path from one terminal 13 to the other will present the same overall resistance and the same resistance per unit length and if a voltage is maintained between the terminals areas the same current will flow in each path whatever the length of the film. There will thus be a substantially constant dissipation of heat per unit area over the whole film. The film shown in FIGURE 1 can moreover be cut into narrower piece since any portion between adjacent lines of slots can serve as a terminal. It will be clear that however many meander paths are left between the terminals the cross sectional area of the terminals is greater than that of the arms of the meander pattern so that the development of heat in the terminals is less than elsewhere. The same result can be obtained by adding metal of higher conductivity to the terminal areas as by clamping or plating.

In FIGURE 2 the pattern is similar to that in FIGURE 1 but the slots 14 extend across the foil 15 and the terminal areas 16 are at the ends. Such a film can be cut into pieces by transverse cuts as any portion between successive lines of slots can serve as terminals.

In some cases the film need not consist of anything more than the metal pattern, but if necesary or desired there may be an insulating film indicated at 17 on one side of the foil 11 or 15 and there may be another indicated at 18 on the other side. Such insulating film may be of plastic or paper for example.

In general the structure in connection with which the film is used will be a multi-layer structure of which one layer is a layer containing an absorbed fluid to be heated, and the structure at the time the current is switched on will be at room temperature. Where the heating operation causes vapours to be driven off and these vapours have to escape on the same side as that to which the heating film is applied the heating film will have small passages through and it will be made porous or perforated as indicated at 19, FIGURES 1 and 2 to allow for the passage of vapour without harm to it or the structure on which the film is used. Such small passages may be useful in other cases. In many cases the heating film itself will be of cheap construction so that it can be thrown away after once using but the invention also includes cases in which the film is retained for repeated use whether in connection with the same layer or by transfer from one layer to another. Often the heating film is provided with an adhesive coating for example a self-adhesive pressure sensitive material to permit easy fixing to the structure.

It is desirable to ensure that if the film is to be used repeatedly but on different layers it can be transferred from one to another without suffering damage because if the pattern is damaged and is still conductive, the distribution of resistance will be affected and there will be a risk of hot spots. If on the other hand it is made of cheap construction so that it can be thrown away it should be desirably made so flimsy that it is practically impossible to avoid destroying it in removing it after use.

In all cases where the pattern can be contacted by a human operator it is so designed that the necessary heating effect can be obtained by a supply of electric current at a low voltage that is to say at a voltage which does not constitute a risk to the operator if he comes into accidental contact with the pattern. Such voltages are usually below 50 and often well below 50 say 12 volts, 6 volts or even lower. Such voltages also make it permissible in many cases, e.g., where the layer to be dried is not conductive, to allow the layer to touch the bare pattern. These voltages have the advantage of simplifying the construction of the film and its use, since the insulating problems presented by high voltages do not arise.

Other fields of use are in connection with the drying and curing, or the drying, curing and heating of paint and similar materials, and of plastic structures and fabrics.

Thus one major field of application of the heating film is its incorporation in structures which are painted. The incorporation may be temporary or permanent. It is proposed for instance to stick a heating film 21 FIGURE 4 on the underside of sheet metal work indicated at 22 before it is painted as at 23. Since the workpiece is metallic there must be an insulating layer between the actual pattern and the workpiece as at 24, but this may be part of the heating film. No insulating layer is shown on the other side of the film 21 but it can be provided if desired. The paint is now dried by supplying current to the heating film instead of by the present methods of stoving the panels or applying heat to them by other means. Since metal is a good heat conductor the heat from the film 21 reaches the part 23 without a steep temperature gradient or in other words the part 23 brought to a temperature a little below that reached by the film 21 and due to the layout of the conductor in the film 21 the heating is substantially uniform over the whole surface. This not only gives an improvement in drying or curing conventional paints but it often permits the substitution of stoving enamels for air drying paints.

Another major field of application is the incorporation of the film in plastic structures and fabrics such as low pressure laminates, articles made with potting resins, plastic castings and larger scale mouldings requiring heat for quick setting. FIGURE 5 shows by way of example an embodiments with the heating film 25 (which here can be a bare foil pattern) between two layers 26 of fibreglass and uncured resin i.e. within the thickness of a plastic structure. The slow drying and curing process of these plastic fabrics is at present hindering the use of these in many industries requiring speedy output from the moulds, presses or jigs for their formation. Thus the production of glass-fibre structures by the so-called wet-lay process is restricted for mass production applications by the practical difficulty of and equipment required for accelerating the heat drying and curing of the structure. The incorporation of the heating film in such structures enables them to be dried and cured quickly and the moulds to be liberated more frequently with consequent saving in floor space and equipment. Heating films incorporated in plastics preferably have small passages (i.e. small holes or pores) through which the fluid resin can flow.

It should be mentioned that the term plastic is used herein to indicate not only materials which when cured are substantially rigid but also materials which are elastomeric, such as natural and synthetic rubber, and polyvinyl chloride.

Where a paint layer, a plastic or fabric is part of an article which subsequently needs to be heated during use or where heating provision for repairs is desired, the film used for the initial operation of drying, curing, etc. may remain in situ and serve subsequently as a heater in the use or repair of the article. In that case the conductive pattern will be laid out so that it can conveniently serve both purposes. Thus it may be operated at different voltages in its original and subsequent uses or it may be arranged so that it can be reconnected to give a different heat output when supplied with current at the same voltage.

Examples of articles in which the same heating film may be used in the original production of the article and in its subsequent service are radiating panels, ironing boards, door mats, vessels such as tanks, beakers, baths and sinks, and pipes, pots, pans, dishes and draining boards.

As above explained, the heating film used in the invention is essentially a thin flexible pattern, preferably of metallic foil. Improved and preferable methods for making these films have been described in my Patents Nos. 3,033,970 and 2,971,073 and particularly my Patent No. 3,020,378. This patent described a heating pattern which is especially suitable for many applications of the present invention when made with aluminum foil coated on both sides. The use of a very low voltage permits the use of stronger foils, and overall, additional plastic film support is sometimes not necessary at all.

As also above explained, the pattern will generally be a meander pattern as shown in FIGURES 1 and 2 in elementary form and as described in these prior applications. Preferably the pattern is such that numerous meander patterns are provided in parallel each pattern covering only a small area of the same convenient module, i.e. unit size. Then a standard film can be produced in rolls of great width and length and can be cut to required size and shapes when the quantity of articles to which it is to be applied is not great enough to warrant the production of a pattern specially for the job. This enables the invention to be applied readily to repair and maintenance work and enables such materials as stoving enamels to be used for this type of work where their use might be otherwise very inconvenient or quite impracticable because the painted surface is in a location or on an article which it would be inconvenient or impossible to transfer to an oven for stoving. The film may be provided with a self-adhesive coating enabling it to be readily applied and stripped after use and can easily be made cheap enough to be dispensible. However with a suitable adhesive it can be stripped without damage and can be re-used, if necessary after a fresh adhesive has been applied to the film or workpiece.

Even where stoving would be possible the present invention enables ovens or hot presses to be dispensed with and while the film may be dispensible, in other cases it may be left permanently in position on the underside of articles having a thin enough wall to make the heat transfer effective, or even between the surface of the article and the layer of paint. In this field the invention may be applied for example to shaped parts of automobile body work, sheet metal parts of domestic equipment such as washing machines, and metalwork in buildings such as pipes, doors and windows and can be used for the original paint drying, while thereafter damage to the paint-work can be repaired even with a stoving enamel. In all these cases if the film is made with a crimped foil pattern as in my Patent No. 3,020,3378 film can readily be applied to intrinsically curved surfaces.

If the pattern contains numerous repeats with separate terminals brought out or accessible at adequate intervals heating can readily be confined to a particular area in the case of local repairs or other cases where this is desirable. Thus in FIGURE 6 which shows only the conductive pattern on the lines of FIGURE 1, slots 27 sub divide the marginal terminal areas into separate areas for each double meander path while in FIGURE 3 which shows only the conductive pattern on the lines of FIGURE 2, slots 28 sub-divide the transverse terminal areas into separate areas for each double meander path. It usually suffices however to provide such slots at less frequent intervals.

As applied to plastic structures and fabrics the film can be applied to the surface or within the thickness of the material and in the latter form it is preferably perforated.

It is particularly applicable to laminated products made from fibre-glass by the so-called wet-lay process.

In all the above cases the heat is conveyed to the layer to be heated by conduction and where consideration of strength appearance or the like do not make it objectionable it is advantageous as in FIGURE 8 to use a heat transmitting layer 31 next to the film 29 which contains heat conductive particles 32 such as graphite or aluminium or other metal powder to ensure better heat conduction in the desired direction while a heat insulating layer 33 such as glass or asbestos fibre is applied on the other side of the heating film to reduce loss of heat in this direction. Such heat insulating layers may be bound with a resin which will resist a higher temperature than that to which the film rises in operation. If necessary a thin electrical insulating layer 34 which will resist the temperature involved may be used between the heating film and the graphite or metal filled layer. Such an insulating film will be necessary for instance where the heating film itself is a bare metallic pattern.

The layer 34 may be regarded as such a layer or as part of the heating film. The layer 31 may be used without the layer 33 or the layer 33 without the layer 31 with less effect than when both are used. By providing the heat conductive layer 31 a heavier loading in watts per unit area can be used without the development of excessive temperature or hot spots.

The perforations in the film are preferably made after the foil pattern is laminated between two insulating films so that the holes are not clogged in the heating film production process. In many cases the perforations are not only in the gaps between the metallic areas of the film, but in the metallic areas as well, and often perforated foil is used in producing the heating films.

The film and the metallic pattern has to cover substantially the whole surface to which it is applied or under which it is fixed, and follow its outline.

Perforated films carrying a metal pattern can be produced as self-adhesive tapes or as shaped labels and fixed to the surface of the covers and walls of the various drying devices for clothes and shoes. For incorporation into such devices these films are made without adhesive backing and fixed underneath the surface of the device.

It will be clear from the various examples in the above description that the fixing of the heating film to the durable structure is effected in principle in one of two different ways. Either the film is applied e.g. stretched or pressed or pressed on or incorporated in the structure, or the structure is pressed on to the film by applying force to the structure e.g. stretching or pressing it.

What I claim is:

1. A method of accelerating by heat solidification of a porous material produced by chemical reaction in a layer of liquid material comprising incorporating in the liquid material a substance which when heated below the temperature of sudden transition under the ambient conditions of the liquid into the solid state evolves a gas, bringing into good heat conductive contact with the liquid layer a heating film the major part of which is occupied by an electrically conductive surface pattern uniformly distributed, passing an electric current through the surface pattern of an intensity which is controlled so that by the time the temperature is reached at which gas is evolved, the liquid layer has attained a viscosity which allows the evolved gas to form pores in it without substantial escape, and continuing the heating at an appropriate temperature below that of sudden transition under ambient conditions of the liquid into the solid state until the solid state is attained.

References Cited
UNITED STATES PATENTS

| | | | |
|---|---|---|---|
| 1,081,330 | 12/1913 | Price | 34—1 |
| 1,757,205 | 5/1930 | Morris | 34—1 |
| 2,352,160 | 6/1944 | Brown | 202—40 |
| 2,391,541 | 12/1945 | Belchetz | 202—40 |
| 2,496,279 | 2/1950 | Ely et al. | 219—545 X |
| 2,929,909 | 3/1960 | Gibbs | 219—542 |
| 3,038,823 | 6/1962 | Currant et al. | 219—542 X |
| 3,066,376 | 12/1962 | Pennell | 264—316 |
| 3,069,728 | 12/1962 | Mindick | 264—316 |
| 3,096,161 | 7/1963 | Morrison et al. | 34—1 |

FREDERICK L. MATTESON Jr., *Primary Examiner.*

ROBERT F. WHITE, WILLIAM F. O'DEA,
*Examiners.*

R. B. MOFFITT, C. R. REMKE, D. A. TAMBURRO,
*Assistant Examiners.*